United States Patent [19]
Sheridan et al.

[11] Patent Number: 6,157,312
[45] Date of Patent: Dec. 5, 2000

[54] APPLIANCE FOR INTEGRATING MULTIPLE FORMS OF COMMUNICATION

[75] Inventors: Michael Sheridan, Oak Hill, Va.; Martin Patterson, Grenoble, France; Pavani Diwanji, San Jose, Calif.; Geoffrey Baehr, Menlo Park, Calif.; David Allison, San Ramon, Calif.; Steven Peart, Campbell, Calif.

[73] Assignee: Sun Microsystems, Inc., Palo Alto, Calif.

[21] Appl. No.: 09/240,606

[22] Filed: Feb. 1, 1999

[51] Int. Cl.⁷ .................................................. G08B 21/00
[52] U.S. Cl. ................. 340/693.5; 340/999; 340/635; 361/679; 361/687; 361/688; 361/690; 361/694; 455/422; 455/556
[58] Field of Search ............................ 340/286.01, 999, 340/693.5, 635; 361/679, 688, 690, 694, 695, 814, 687, 715; 455/422, 556

[56] References Cited

U.S. PATENT DOCUMENTS

| 5,796,580 | 8/1998 | Komatsu et al. | 361/687 |
| 6,058,304 | 5/2000 | Callaghan et al. | 455/422 |

*Primary Examiner*—Daniel J. Wu
*Assistant Examiner*—Tai T. Nguyen
*Attorney, Agent, or Firm*—Finnegan, Henderson, Farabow, Garrett & Dunner, L.L.P.

[57] ABSTRACT

A communication appliance with a desktop unit and a secondary unit. The desktop unit includes an outer casing, bottom feet, openings in the outer casing for control elements, a plurality of heat-producing electronic components and at least one speaker. The bottom feet extend from a bottom of the outer casing and support the outer casing on a surface such that the bottom of the outer casing is spaced from the surface. The control elements are used for operating the communication appliance. The outer casing includes a plurality of cooling slots for cooling electronic components found in the interior of the communication appliance so that a fan or other external device is not needed.

21 Claims, 7 Drawing Sheets

APPLIANCE FOR INTEGRATING MULTIPLE FORMS OF COMMUNICATION

BACKGROUND OF THE INVENTION

1. Field of the Invention

The present invention relates to an appliance for integrating voice mail, email, fax, paging and other common forms of communication. More particularly, the present invention is related to a communication appliance which is placed on the desktop and has a passive cooling system.

2. Description of the Related Art

In the past, separate devices were required for each of the forms of communications found in an office. For example, an office might include a separate fax machine, answering machine, web server, and pager. The presence of all of these devices takes up valuable space and can clutter a small office. When placed on a desktop, it is desirable that an appliance for communication, such as a telephone, facsimile machine, etc., take up very little space. This is especially important in the home or small office where users often have space constraints. The integration of a plurality of such appliances into a single appliance is therefore desirable.

It is desirable to have a communication appliance that will generate the minimum amount of background noise that may disturb the user. In addition, since a communication appliance is generally powered on twenty-four hours a day, it is important to have the device run as quietly as possible. Many conventional communication appliances, such as a web server, often have fan cooling systems. Since these devices are often placed in the home, the noise associated with a fan cooling system is undesirable, because fan noise can be annoying to those in the home.

Therefore, an integrated communication appliance which is small and quiet is very desirable.

SUMMARY OF THE INVENTION

Accordingly, the present invention is directed to a compact and fanless communication appliance that substantially obviates one or more of the problems due to the limitations and disadvantages of the related art. Appliances consistent with the present invention include a main unit and a secondary unit. The main unit, which may be placed on a desk top, includes an outer casing that has a plurality of cooling slots for allowing entry and exit of air into a interior of the main unit. The slots are configured so that there is sufficient air flow to cool the interior of the main unit without the need for an internal fan or other external cooling device. This reduces the amount of noise created by the appliance. The outer casing includes openings for control elements for operating the communication appliance. The communication appliance also provides a secondary unit at a spaced location from the main unit. The secondary unit may be placed on the floor or other suitable location. The secondary unit contains sockets for external connections.

To achieve these and other advantages and in accordance with the purpose of the invention, as embodied and broadly described herein, the invention comprises a communication appliance which includes an outer casing, bottom feet, openings in the outer casing for supporting control elements, a plurality of heat-producing electronic components, and at least one speaker. The bottom feet extend from a bottom of the outer casing for supporting the outer casing on a surface. The bottom feet are configured such that the bottom of the outer casing is spaced from the surface. The communication appliance also includes openings in the outer casing for support therein of control elements for operating the communication appliance. The communication appliance further includes a plurality of heat-producing electronic components and at least one speaker. The outer casing includes a plurality of cooling slots including at least one bottom cooling slot located in the bottom of the outer casing for allowing entry of air into the interior of the outer casing. The outer casing further includes at least one side cooling slot located in a side of the outer casing, the side cooling slot adjacent to the speaker in the interior of the outer casing and thereby also serving as a speaker aperture. The distance between the at least one side cooling slot and the speaker is sufficient to allow entry of air from outside of the outer casing. The outer casing also includes at least one top cooling slot located in a top of the outer casing for allowing entry and exit of air to and from the interior of the outer casing.

In a further aspect of the invention, a secondary unit is at a spaced location from the outer casing. The outer casing and secondary unit may be connected by a cable. Alternately, a cordless signal transmitting means may be provided between the outer casing and secondary unit.

In another aspect of the invention, the side cooling slot is sized and shaped and sufficiently spaced from its respective speaker to prevent access by the operator's hands to the interior of the outer casing. The outer casing includes a front casing portion and a back casing portion. The at least one top cooling slot comprises a pair of slots, one of the top cooling slots formed in the front portion, the other of the top cooling slots formed in the back portion.

In a yet a further aspect of the invention, at least one of the control elements includes at least one display element for displaying the presence of a communication received by the communication appliance, and at least one of the control elements includes a button to correspond to the display element for performing an operation.

In another aspect of the invention, the communication appliance comprises a desktop unit including an outer casing, bottom feet, openings in the outer casing, a plurality of heat-producing electronic components and at least one speaker. The communication appliance also includes a floor unit at a spaced location from the desktop unit.

The present invention is also directed towards a housing for a communication appliance having a plurality of heat-producing electronic components and at least one speaker. The housing includes an outer casing and bottom feet. The outer casing houses the electronic components and the speaker. The outer casing includes at least one side cooling slot located in a side of the outer casing and at least one top cooling slot located in a top of the outer casing. The bottom feet extend from a bottom of the outer casing for supporting the outer casing on a surface such that the bottom of the outer casing is spaced from the surface. The bottom of the outer casing includes a bottom cooling slot for allowing entry of air from said space between the bottom of the outer casing and the surface into the interior of the outer casing.

It is to be understood that both the foregoing general description and the following detailed description are exemplary and explanatory only and are not restrictive of the invention, as claimed. The accompanying drawings, which are incorporated in and constitute a part of this specification, illustrate several embodiments of the invention and together with the description, serve to explain the principles of the invention.

DETAILED DESCRIPTION OF THE PREFERRED EMBODIMENTS

The invention is directed toward a communication appliance including an outer casing; bottom feet extending from a bottom of the outer casing for supporting the outer casing on surface such that the bottom of the outer casing for supporting the outer casing on a surface such that the bottom of the outer casing is spaced from the surface; openings in the outer casing for support therein of control elements for operating the communication device; a plurality of heat-producing electronic components; and at least one speaker. The outer casing includes a plurality of cooling slots. The plurality of cooling slots includes at least one bottom cooling slot located in the bottom of the outer casing for allowing entry of air into the interior of the outer casing, at least one side cooling slot located in a side of the outer casing, the at least one side cooling slot being adjacent to the speaker in the interior of the outer casing, the at least one side cooling slot also serving as a speaker aperture, a distance between the at least one side cooling slot and the speaker being sufficient to allow entry of air from outside of the outer casing, and at least one top cooling slot located in a top of the outer casing for allowing entry and exit of air to and from the interior of the outer casing.

Reference will now be made in detail to the structure of the present invention, an example of which is illustrated in the accompanying drawings. Wherever possible, the same reference numbers will be used throughout the drawings to refer to the same or like parts.

The exemplary embodiment of the communication appliance of the present invention is shown in FIGS. 1–13. The communication appliance is generally comprised of two main components, a desktop unit 10 and a floor unit 70. FIGS. 1–9 show desktop unit 10, whereas FIGS. 10–13 show floor unit 70.

Figure 1A:
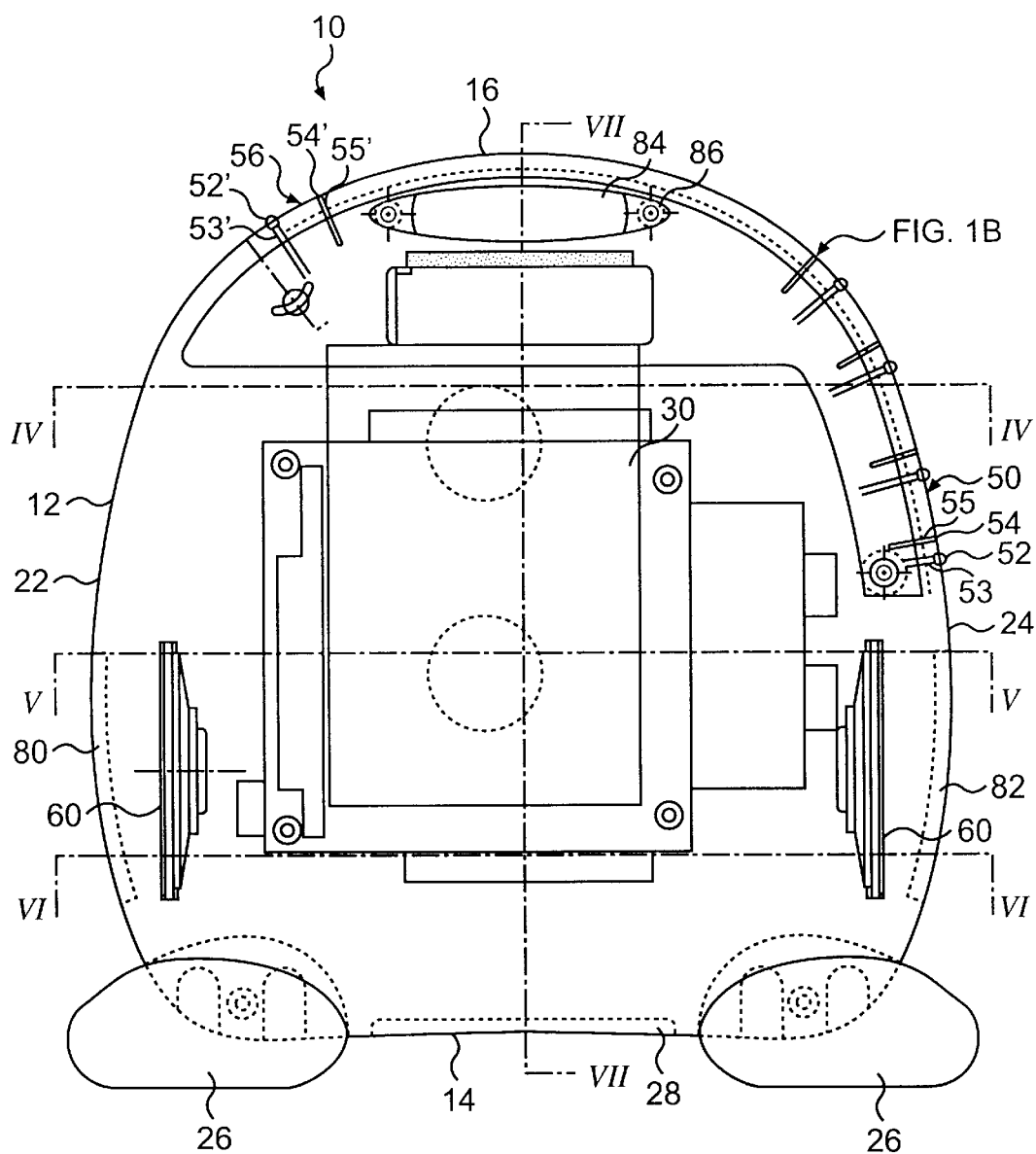
FIG. 1 is a front view of a desktop unit of a communication appliance in accordance with the invention.
Figure 1B:
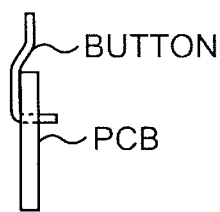

In accordance with the invention, the desktop unit includes an outer casing. As embodied herein and shown in FIGS. 1–9, desktop unit 10 of the communication device includes an outer casing 12. The outer casing 12 may be made out of any suitable material such as a plastic, rubber or synthetic compound. The outer casing 12 is shown by way of example to be formed of a front casing portion 18 and a back casing portion 20. Reference number 14 represents a bottom of the outer casing, 16 represents a top of the outer casing, 22 represents a left side of the outer casing and 24 represents a right side of the outer casing, as shown in FIG. 1. In the embodiment shown, the outer casing is in a generally rectangular shape with rounded corners, however, the desktop unit can be any of a large number of shapes. The outer casing may also be formed of any number of portions besides that shown in the figures.

In accordance with the invention, the outer casing includes feet for supporting the outer casing on a surface. As embodied herein, the outer casing 12 includes bottom feet 14 extending from a bottom 14 of the outer casing 12 for supporting the outer casing. The bottom feet 26 extend from the left and right sides of the bottom 14 of the outer casing. The feet 26 have flat bottoms and may be made out of a variety of materials including plastic and rubber. The feet 26 provide a sturdy support for the outer casing and should prevent tipping or sliding of the outer casing. The feet 26 extend from the bottom the outer casing to create a space between the bottom 14 of the outer casing and the surface on which the bottom feet rest. Ordinarily, the surface on which the bottom feet rest will be a desktop or other horizontal surface.

In accordance with this invention, the outer casing includes a plurality of cooling slots. As embodied herein, the outer casing 12 includes a plurality of cooling slots which will be discussed below. The cooling slots allow entry and exit of air to and from the interior of the outer casing. Reference will be made below to the drawings which typically show a single cooling slot at each location. It should be understood that each location may include multiple cooling slots. The cooling slots can be of a variety of sizes and shapes. Although the figures show the slots being generally elliptical or oval in shape, it should be understood that the shape is not limited to those shown in the drawings. The slots shown in the figures are exemplary only and are not meant to be limiting. In addition, a single slot may be grid-shaped and have a plurality of openings in the slot.

Figure 3:
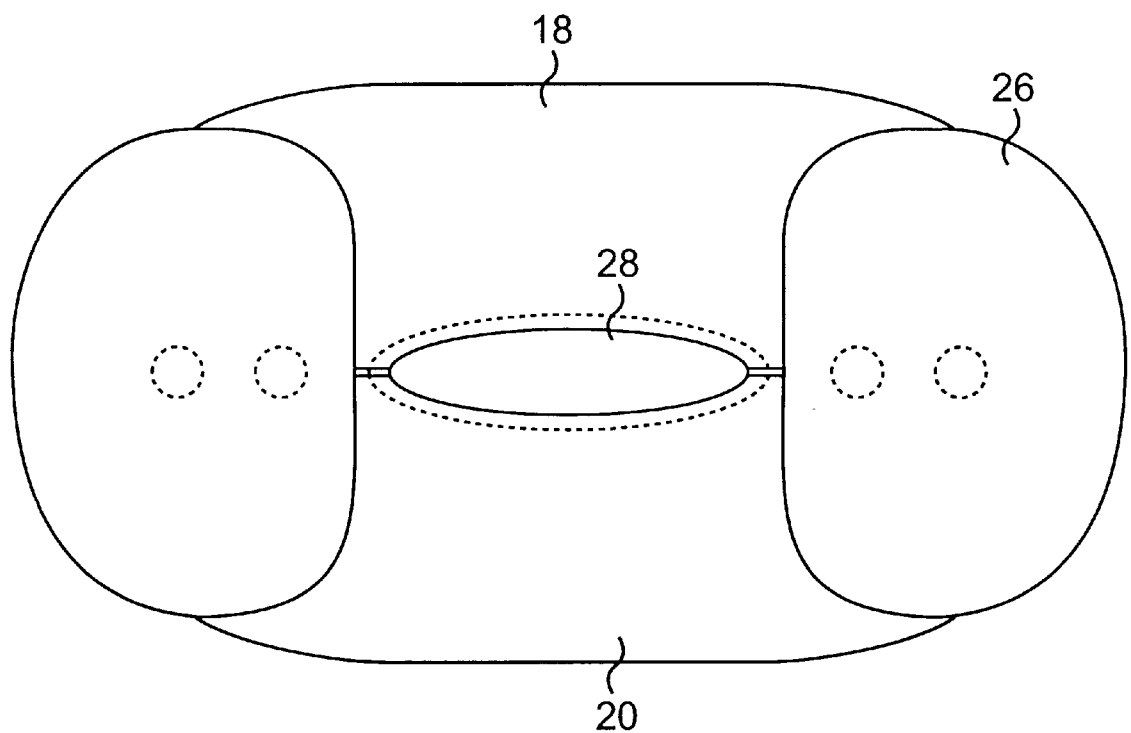
FIG. 3 is a bottom view of the desktop unit of FIG. 1.
Figure 4:
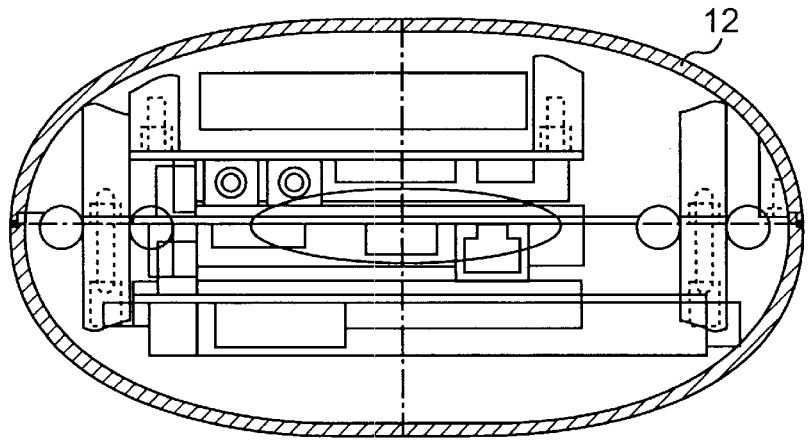
FIG. 4 is a cross-sectional view along line IV—IV of FIG. 1.
Figure 5:
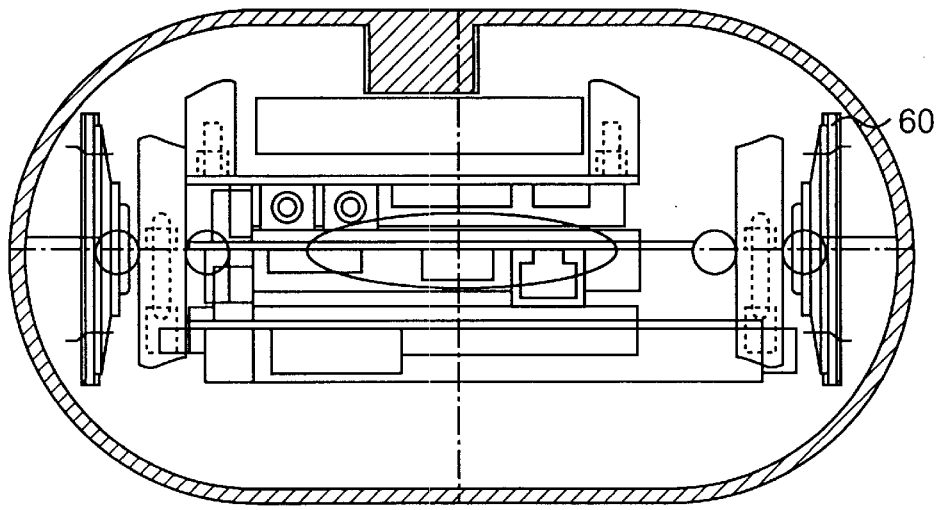
FIG. 5 is a cross-sectional view along line V—V of FIG. 1.
Figure 6:
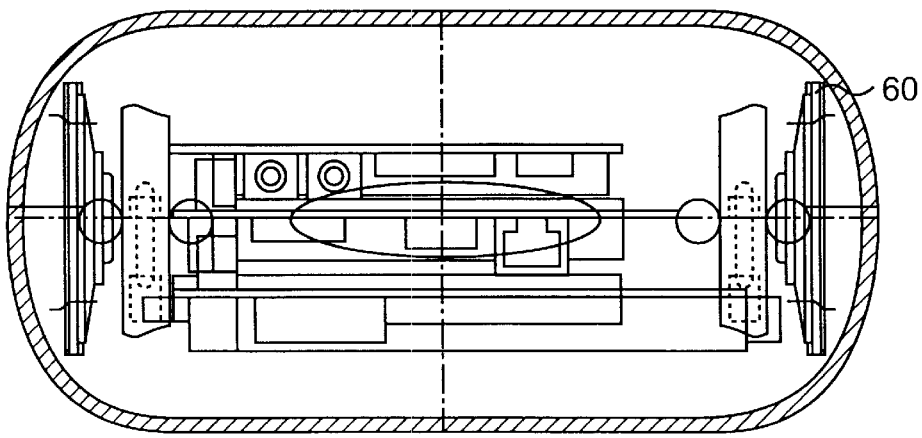
FIG. 6 is a cross-sectional view along line VI—VI of FIG. 1.
Figure 8:
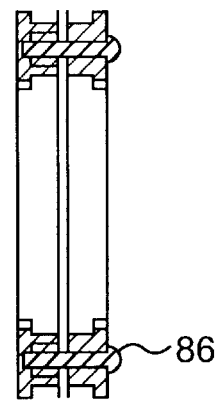
FIG. 8 is a partial cross-sectional view along line VIII—VIII of FIG. 2.

The outer casing is provided with a bottom cooling slot 28 located in the bottom 14 of the outer casing for allowing entry of air into the interior of the outer casing. In the embodiment shown in the figures, the bottom cooling slot is provided in the bottom of the outer casing in the region between the bottom feet 26, as best seen in FIGS. 1 and 3. This bottom cooling slot 28 allows entry of air into the interior of the outer casing. In the embodiment shown in FIG. 1, the bottom portion of the outer casing is raised off the desktop by approximately 10 mm. The precise amount may be varied depending upon the cooling needs of the specific appliance. However, the spacing above the desktop should always be sufficient to allow flow of cooling air into the bottom slot 28.

In accordance with this invention, the outer casing is configured to house a speaker. As embodied herein, the desktop unit includes at least one speaker 60. Preferably, the outer casing holds a pair of speakers 60 adjacent the left side 22 and right side 24 of the outer casing, respectively. Speaker apertures 80 and 82 are provided in the outer casing for each speaker. The speaker apertures also serve as left and right side cooling slots 80 and 82. The respective speakers are spaced from the side cooling slots by a distance sufficient to allow entry of air from outside of the outer casing. These side slots 80 and 82 will provide additional cooling air flow, supplementing the air which is entering through the cooling slot 28 in the bottom portion. The amount of spacing of the speakers from the side slots should be sufficient as to allow an uninterrupted flow of cooling air to enter the outer casing.

In the embodiment shown in FIG. 1, the spacing between the speaker and the slot ranges from approximately 10 mm to 15 mm. This amount may vary depending on the specific cooling needs of the application. Moreover, the speakers 60 and slots 80 and 82 are sized, shaped and spaced so as to prevent access to the interior of the outer casing and CPU board by the operator's fingers or other objects. The speakers serve as a barrier to prevent damage to the CPU board and other internal components. The slots can be any of a large variety of shapes and are not limited to the generally elliptical or oval shape shown in FIGS. 2 and 7.

The outer casing also includes at least one top cooling slot 84 located in a top 16 of the outer casing for allowing entry and exit of air to and from the interior of the outer casing. In the embodiment shown in the figures, the top 16 of the outer casing is provided with a pair of top cooling slots 84. The heat from the electrical components can easily rise and pass out of the cooling slots 84. The cooling slots are provided between two fasteners 86 shown in FIGS. 1, 7, and 8. These cooling slots are also designed to prevent access by an operator's fingers to the electronic components of main unit.

In accordance with this invention, the desktop unit includes heat-producing electronic components. As embodied herein, the desktop unit 10 includes a plurality of heat-producing electronic components 30. The main heat-producing electrical components are the microprocessor or central processor (CPU) board and the hard disk drive. A variety of other electronic components are contained inside the outer casing. These components include hardware required for a communications device, such as a microphone, modem board, etc. Heat is generated from these components, thereby requiring a cooling system to prevent them from overheating. The CPU board is preferably mounted vertically in order to create a vertical air flow along the CPU board. Cool ambient air will enter at the bottom of the outer casing through the respective bottom cooling slots described above. As the cooling air approaches the region of the electronic components (e.g. CPU board), the air will increase in temperature as a result of the heat generated by the electronic components. The heated air will then begin to rise. By stacking the components in a vertical fashion, the rising air will not be obstructed and can more easily flow in the upward vertical direction toward the top cooling slots. The upward flow of air helps draw air in through the side slots. Supplementing the cool air from the bottom slot with additional cool air from the side slots allows the electronic components in the upper portion of the stack to be cooled as well as the components at the bottom of the stack. The heated air exits out the slots in the top of the casing.

The design of the present invention allows for sufficient cooling of the electronic components so that the components are not damaged and may operate properly. A main concern was that a fanless system would not be able to provide sufficient cooling of the interior electronic components. In a test run, it was discovered that the present system would provide sufficient cooling to prevent the interior temperature from rising much above 85 deg. F. under normal operating conditions (depending on the ambient air temperature). This provides more than adequate cooling. A recommended maximum operating temperature for a typical microprocessor used in such an appliance is approximately 158 deg. F. A recommended maximum temperature for a typical hard drive used in a communication appliance is approximately 131 deg. F. The maximum temperature measured within the outer casing is well below these maximum temperatures for the components.

By providing sufficiently large and properly placed cooling slots on the desktop unit, the use of a fan can be avoided. This type of passive cooling system is silent, thereby not disturbing the user with fan noise. This is especially advantageous in the environment in which the communications device is used, i.e. the home or small office, where noise is a greater concern.

Figure 2:
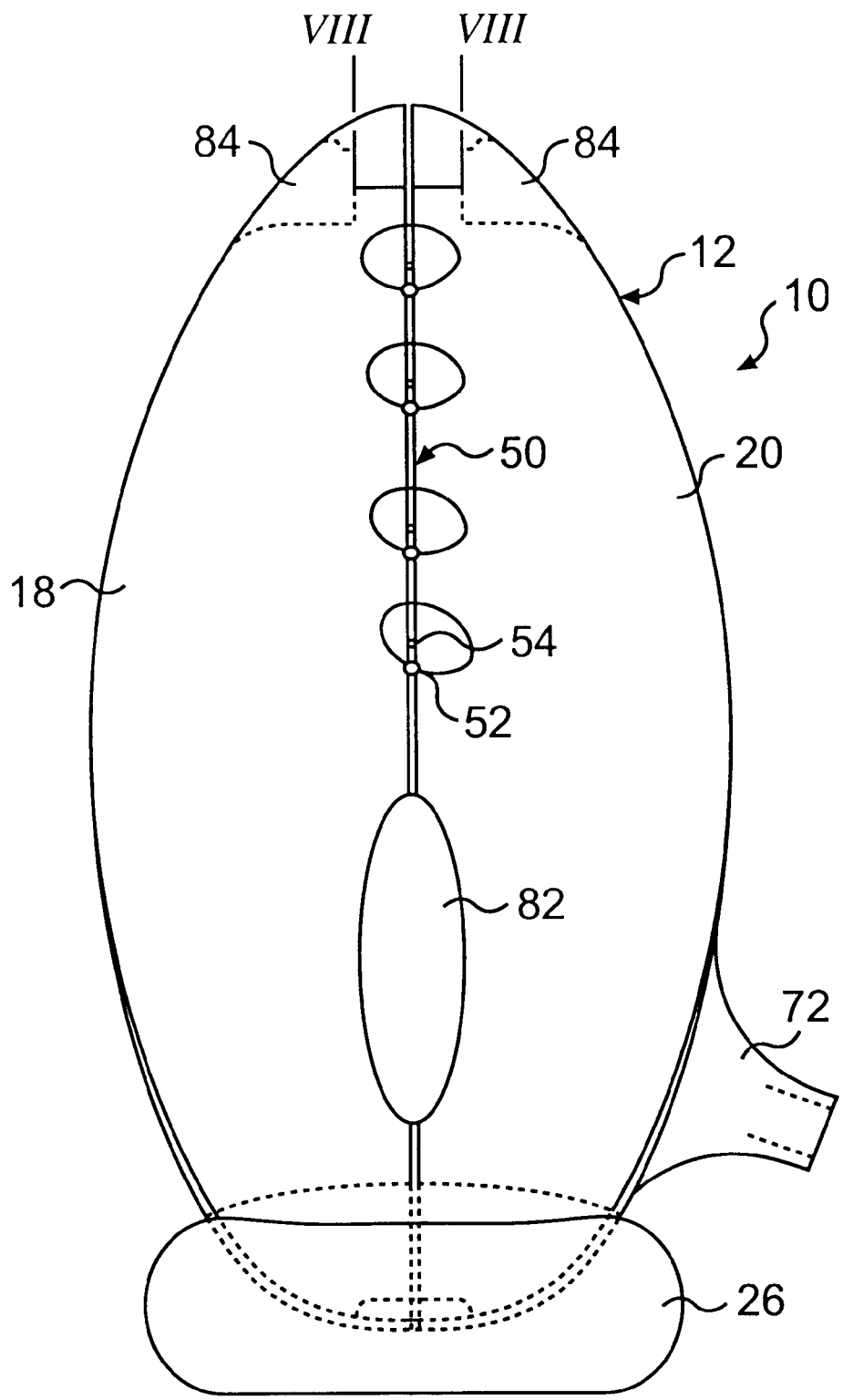
FIG. 2 is a right side view of the desktop unit of FIG. 1.

Preferably, the desktop unit 10 includes openings in the outer casing for support therein of control elements for operating the communication device. The control elements are made up of display elements 52 and 52' and buttons 54 and 54'. The openings 53, 53', 55 and 55' are formed in the outer housing to support the control elements for operating the communication device. A main display panel generally shown at 50 includes a plurality of display elements 52. The display elements of the preferred embodiment are LEDs 52. The main display panel also includes a plurality of keys or buttons 54, which correspond to the display elements, as best shown in FIGS. 1 and 2. The LEDs 52 are supported in the outer casing by openings 53. The corresponding buttons 54 for each LED are supported in the outer casing by openings 55. The main panel 50 is shown at the location where the front portion 18 and the back portion 20 join together. This corresponds to the right side 24 of the outer casing in FIG. 1. It should be understood however that the display elements may be located at any position on the outer casing. In the preferred embodiment, three of the LEDs 52 on the main panel are used to indicate the presence of e-mail, voice-mail and fax messages. In the case of e-mail and fax, text-to-speech is used to give a spoken summary of the message. The corresponding buttons 54 for the message LEDs function to start the playback of messages of the given type. In the case of email or fax, text-to-speech may be used to give a spoken summary of the message. The fourth button and LED on the main display panel is used for deleting messages. While the drawings show a total of four LEDs and buttons on the main panel, any number of the such may be provided, depending on the number of forms of communications which the communication appliance can handle and the number of functions that are desired. In addition, the buttons may be used for different functions than the functions recited in the example above.

In another aspect of the invention, the desktop unit also includes a secondary display panel 56 on a side of the outer casing as best shown in FIG. 1. The secondary display panel includes control elements comprising a record button 54' and display element or LED 52'. The record button 54' is supported in opening 55' of the outer casing. The display element 52' is supported in opening 53' of the outer casing. The record button 54' can be used for a variety of purposes including recording a new outgoing greeting via an internal microphone and turning the answering machine function on or off. It is understood that a plurality of LEDs and corresponding keys may also be provided on the secondary display panel.

The buttons 54 and 54' are in the shape of plastic spacer components which protrude through the outer casing. Depressing the buttons causes a switch to be pushed on the main circuit board. The LEDs 52 and 52' also protrude from the outer casing, as shown in FIG. 1. This provides an easy method of notifying the user of each type of incoming message. In FIG. 1, the buttons are arranged so that the communication appliance may be operated without the operator needing to adjust the position of their hand on the communication appliance. An operator's four fingers will neatly correspond with the four buttons on the main display panel. The operator's thumb will align with the record button on the secondary display panel. Therefore, the communication appliance can be comfortably operated by the operator.

In accordance with this invention, a floor unit is provided. As embodied herein, the communication device also includes a secondary or floor unit 70 at a spaced location from the outer casing. The floor unit is shown in FIGS. 10–13. The floor unit 70 provides connectivity to peripheral devices without encumbering the user's desktop. All external connectors are placed on the floor mounted unit 70. The floor unit is provided with a plurality of sockets 74 to which power, phone, fax and pager connections are made, as well as connections to other devices such as personal computers. Since the connections from these external devices are normally at floor level, the use of the floor unit will reduce the amount of wiring needed and will free the desktop of cumbersome wiring.

Figure 7:
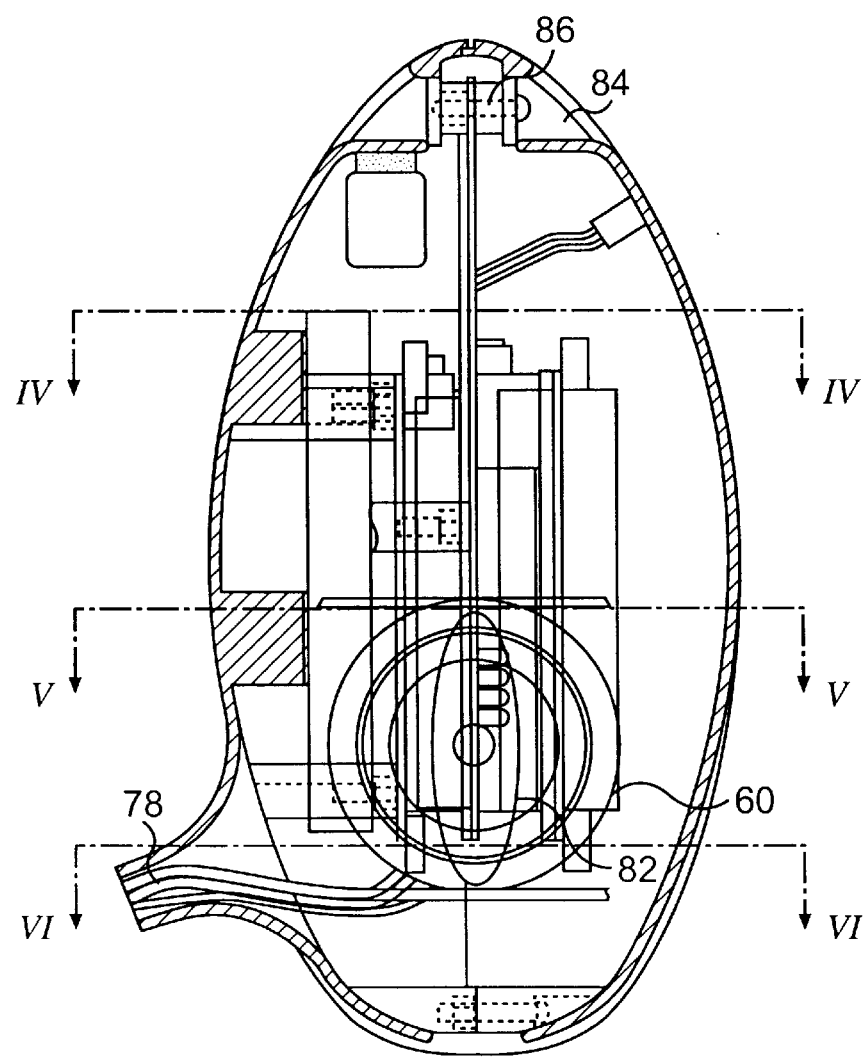
FIG. 7 is a cross-sectional view along line VII—VII of FIG. 1.
Figure 9:
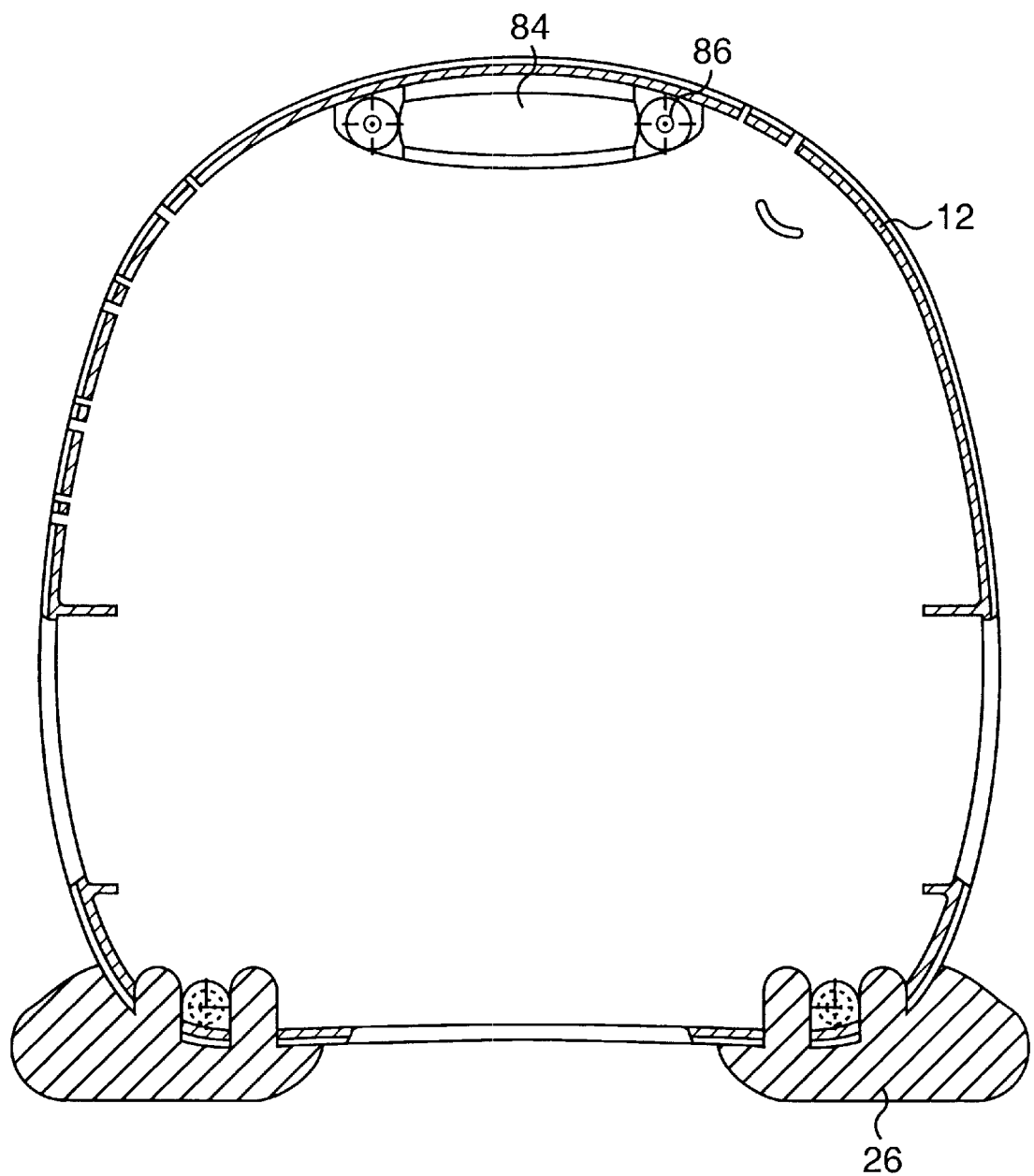
FIG. 9 is a partial sectional view of the casing and bottom feet of the desktop unit of FIG. 1.
Figure 10:
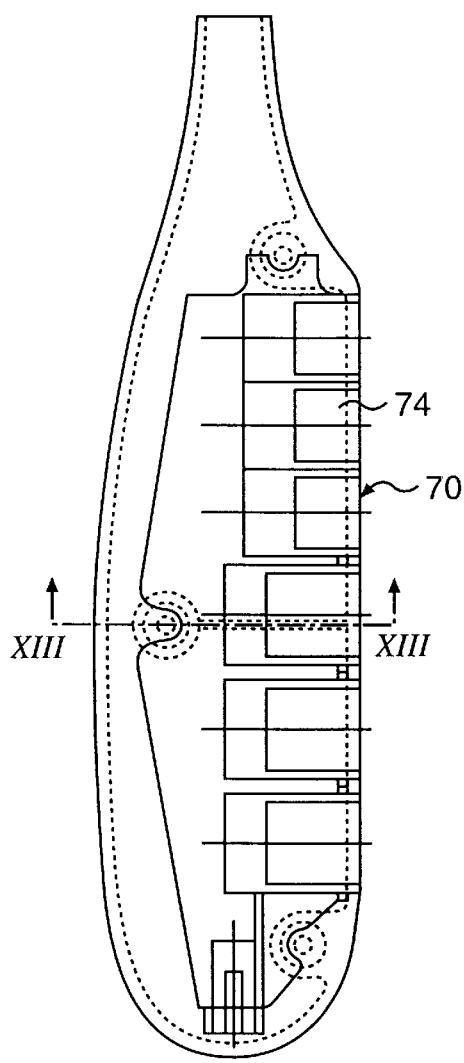
FIG. 10 is a front view of a floor unit of a communication device in accordance with the invention.
Figure 11:
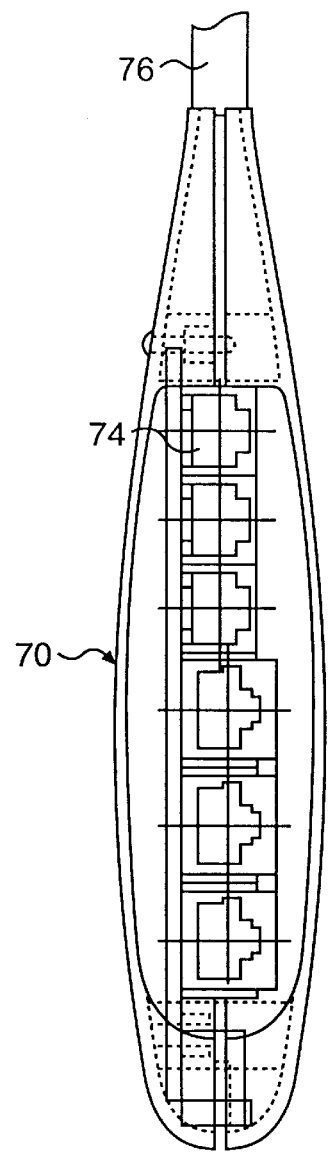
FIG. 11 is a side view of the floor unit of FIG. 10.
Figure 12:
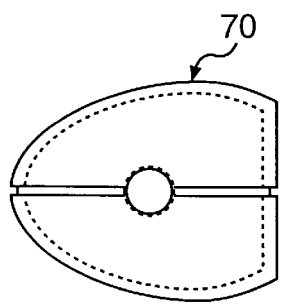
FIG. 12 is an end view of the floor unit of FIG. 10.
Figure 13:
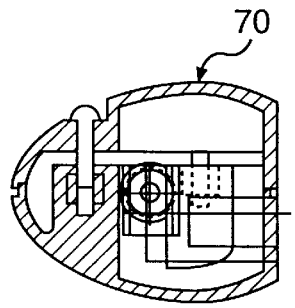
FIG. 13 is a cross-sectional view along line XIII—XIII of FIG. 10.

In one preferred embodiment, the desktop unit 10 has a cable 78 for connecting the outer casing and the secondary unit. As shown in FIG. 2, the outer casing includes a connecting portion 72 on the back portion 20. The connecting portion contains a plurality of cables 78 as shown in FIG. 7 which are connected to the floor unit 70. The cables 78 are contained within a larger cable 76 until the cable reaches floor unit 70.

In an alternative embodiment, the communication device includes a signal transmitting means between the outer casing and secondary unit. In this embodiment, the signal transmitting means is cordless, and can include any of the known types of wireless transmitting devices. In this manner, many of the components of the desktop unit could be placed at a remote location such as a wiring closet. The components of the main and secondary panels, as well as the speaker and microphone, could then be placed at any location convenient to the user. This would significantly cut down on wiring, as well as provide greater mobility to the user.

The communication appliance of the present invention is especially suitable for small businesses, home offices, work groups and mobile professionals. In the preferred embodiment, the communication appliance integrates voice mail, email, fax, paging and other common forms of communication with Internet access. Because the communication appliance is quiet, it is particularly suitable for use at home or in a small office. In addition, the device is small, so it does not take up much space on a user's desktop. Also, the device has sufficient cooling, so it may be left on twenty four hours a day.

It will be apparent to those skilled in the art that various modifications and variations can be made in the design of the present invention and in construction of this communication appliance without departing from the scope or spirit of the invention. Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

We claim:

1. A communication appliance comprising:
   an outer casing;
   bottom feet extending from a bottom of the outer casing for supporting the outer casing on a surface such that the bottom of the outer casing is spaced from the surface;
   openings in the outer casing for support therein of control elements for operating the communication device;
   a plurality of heat-producing electronic components supported within the outer casing; and
   at least one speaker;
   wherein the outer casing includes a plurality of cooling slots including at least one bottom cooling slot located in the bottom of the outer casing for allowing entry of air into the interior of the outer casing, at least one side cooling slot located in a side of the outer casing, the at least one side cooling slot being adjacent to the speaker in the interior of the outer casing, the at least one side cooling slot also serving as a speaker aperture, a distance between the at least one side cooling slot and the speaker being sufficient to allow entry of air from outside of the outer casing, and at least one top cooling slot located in a top of the outer casing for allowing entry and exit of air to and from the interior of the outer casing.

2. The communication appliance of claim 1, further including a secondary unit at a spaced location from the outer casing.

3. The communication appliance of claim 2, wherein the secondary unit includes sockets for external connections.

4. The communication appliance of claim 2, further comprising a cable for connecting the outer casing and secondary unit.

5. The communication appliance of claim 2, further comprising a signal transmitting means between the outer casing and secondary unit, wherein the signal transmitting means is cordless.

6. The communication appliance of claim 1, wherein the outer casing houses the plurality of electronic components, at least one of the electronic components being vertically mounted within the outer casing in order to create a vertical air flow along the at least one electronic component.

7. The communication appliance of claim 1, wherein the at least one side cooling slot is sized and shaped and spaced from its respective speaker to prevent access by the operator's hands to the interior of the outer casing.

8. The communication appliance of claim 1, wherein the outer casing includes a front casing portion and a back casing portion joined together.

9. The communication appliance of claim 8, wherein said at least one top cooling slot comprises a pair of slots, one of the top cooling slots formed in the front casing portion, the other of the top cooling slots formed in the back casing portion.

10. The communication appliance of claim 8, wherein the control elements are located on at least one side of the outer casing at a position where the front casing portion and back casing portion are joined.

11. The communication appliance of claim 1, wherein the plurality of heat-producing electronic components includes a microprocessor mounted on a circuit board.

12. The communication appliance of claim 1, wherein at least one of the control elements includes at least one display element for displaying the presence of a communication received by the communication appliance, and at least one of the control elements includes a button to correspond to the display element for performing an operation.

13. The communication appliance of claim 12, wherein said button is used to play back a message.

14. The communication appliance of claim 1, wherein at least one of the control elements is used to delete a communication received by the communication appliance.

15. The communication appliance of claim 1, wherein at least one of the control elements is used to record a message.

16. A communication appliance comprising:

a floor unit; and a desktop unit including:

an outer casing;

bottom feet extending from a bottom of the outer casing for supporting the outer casing on a surface such that the bottom of the outer casing is spaced from the surface;

openings in the outer casing for support therein of control elements for operating the communication device;

a plurality of heat-producing electronic components supported within the outer casing; and at least one speaker;

wherein the outer casing includes a plurality of cooling slots including at least one bottom cooling slot located in the bottom of the outer casing for allowing entry of air into the interior of the outer casing, at least one side cooling slot located in a side of the outer casing, the at least one side cooling slot being adjacent to the speaker in the interior of the outer casing, the at least one side cooling slot also serving as a speaker aperture, a distance between the at least one side cooling slot and the speaker being sufficient to allow entry of air from outside of the outer casing, and at least one top cooling slot located in a top of the outer casing for allowing entry and exit of air to and from the interior of the outer casing.

17. The communication appliance of claim 16, wherein the floor unit contains sockets for internal connections.

18. A housing for a communication appliance having a plurality of heat-producing electronic components and at least one speaker, the housing comprising:

an outer casing for housing the plurality of electronic components and the at least one speaker, the outer casing including at least one side cooling slot located in a side of the outer casing and at least one top cooling slot located in a top of the outer casing; and bottom feet extending from a bottom of the outer casing for supporting the outer casing on a surface such that the bottom of the outer casing is spaced from the surface, the bottom of the outer casing including a bottom cooling slot for allowing entry of air from said space between the bottom of the outer casing and the surface into the interior of the outer casing.

19. The housing of claim 18, wherein the at least one side cooling slot is adjacent to the speaker in the interior of the outer casing, a distance between the at least one side cooling slot and the speaker being sufficient to allow entry of air from outside of the outer casing.

20. A housing for a communication appliance, comprising:

an outer casing including at least one side cooling slot located in a side of the outer casing and at least one top cooling slot located in a top of the outer casing; and bottom feet extending from a bottom of the outer casing for supporting the outer casing on a surface such that the bottom of the outer casing is spaced from the surface, the bottom of the outer casing including a bottom cooling slot for allowing entry of air from said space between the bottom of the outer casing and the surface into the interior of the outer casing.

21. The housing of claim 20, wherein the at least one side cooling slot is adjacent to a speaker in the interior of the outer casing, a distance between the at least one side cooling slot and the speaker being sufficient to allow entry of air from outside of the outer casing.

* * * * *